United States Patent [19]
Satzler

[11] Patent Number: 4,893,883
[45] Date of Patent: Jan. 16, 1990

[54] BELT TENSION CONTROL SYSTEM
[75] Inventor: Ronald L. Satzler, Princeville, Ill.
[73] Assignee: Caterpillar Inc., Peoria, Ill.
[21] Appl. No.: 162,830
[22] Filed: Mar. 2, 1988
[51] Int. Cl.$^4$ .......................................... B62D 55/30
[52] U.S. Cl. ........................................ 305/10; 180/9.1
[58] Field of Search ...................... 305/10, 32, 29, 31; 180/9.1, 231; 188/67

[56] References Cited
U.S. PATENT DOCUMENTS

| | | | |
|---|---|---|---|
| 3,216,772 | 11/1965 | Day | 305/32 |
| 3,310,127 | 3/1967 | Siber et al. | 180/9.2 |
| 3,327,798 | 6/1967 | Siber et al. | 180/6.7 |
| 3,901,563 | 8/1975 | Day | 305/10 |
| 3,972,569 | 8/1976 | Bricknell | 305/10 |
| 4,534,269 | 8/1985 | Scerbo et al. | 188/67 |

Primary Examiner—Charles A. Marmor
Assistant Examiner—Donn McGiehan
Attorney, Agent, or Firm—John W. Grant

[57] ABSTRACT

Hydraulic recoil mechanisms are useful, for example, in maintaining desired tension in the drive belts of vehicles. The hydraulic components of such mechanisms are prone to leakage over an extended period of frictionally driven belted non-usage and thereby allow the tension in the belts to gradually decrease. The subject belt tension control system includes a friction locking device to automatically lock the piston rod relative to the cylinder to maintain a predetermined level of tension in the belt when the pump which furnishes pressurized hydraulic fluid to the system stops operating. Thus, the frictional couple between the belt and the drive wheel is maintained during periods of non-use and the parking brake is effective to hold the vehicle at a stationary position.

6 Claims, 2 Drawing Sheets

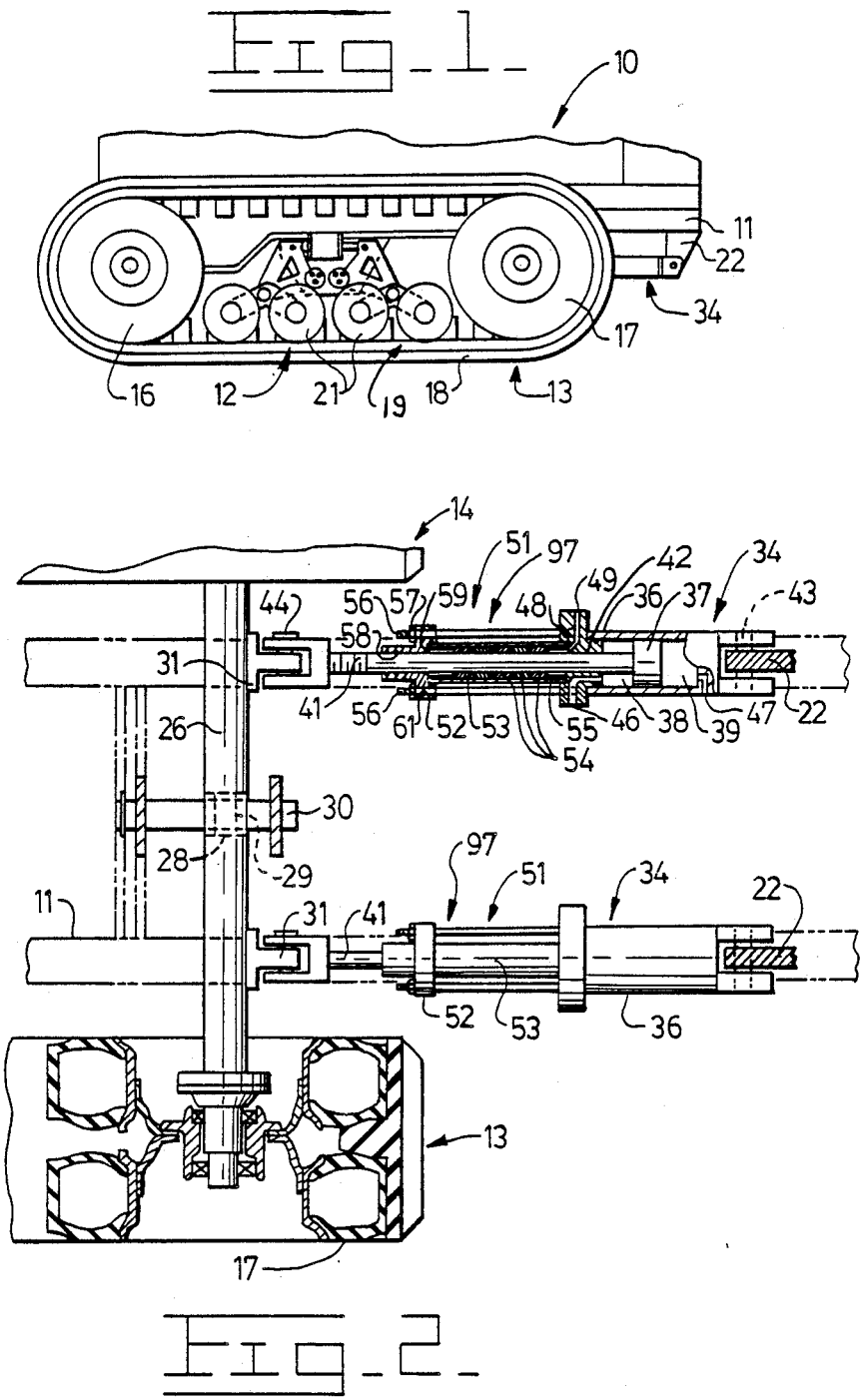

BELT TENSION CONTROL SYSTEM

DESCRIPTION

1. Technical Field

This invention relates generally to frictionally driven vehicular propulsion belt systems and more particularly to a belt tension control system for maintaining tension in the endless drive belt.

2. Background Art

The drive belts used on belt driven vehicles are normally entrained about a drive wheel and an idler wheel. In a frictionally driven vehicular propulsion system the frictional couple between the endless belt and the drive wheel for driving the belt is dependent upon maintaining appropriate tension in the belt. Thus the idler wheel is generally movable in a fore and aft direction relative to the drive wheel for controlling the tension in the drive belt. A recoil system is normally employed for the dual function of biasing the idler wheel in a forward direction to maintain the appropriate tension in the belt and permitting the idler wheel to recoil rearwardly against the biasing force to prevent over tensioning of the belt upon ingestion of debris between the belt and drive wheel or idler wheel. Some recoil systems use a linear actuator for controlling the fore and aft movement of the idler wheel and a hydraulic control system for maintaining a desired fluid pressure in the hydraulic actuator. Pressurizing the hydraulic actuator to the desired fluid pressure generates the appropriate tension in the belt.

The parking brake for such vehicles also relies on the frictional couple between the belt and drive wheel for locking he vehicle in a stationery position. One of the problems associated with the heretofore known hydraulic recoil systems is their inability to maintain the fluid pressure in the hydraulic actuator over an extended period of time due to leakage around the seals or through the valves when the pump is not operating. When fluid pressure decays in the hydraulic actuator the tension in the belt relaxes and the frictional couple between the belt and the drive wheel diminishes. This could let the belt slip relative to the drive wheel potentially resulting in uncontrolled movement of the vehicle.

The present invention is directed to overcoming one or more of the problems as set forth above.

DISCLOSURE OF THE INVENTION

In one aspect of the present invention, a belt tension control system is provided for maintaining tension in an endless drive belt entrained about a drive wheel and an idler wheel which is movable relative to the drive wheel for adjusting the tension in the belt. The system comprises a hydraulic actuator including a cylinder, a piston slidably disposed in the cylinder and defining an actuating chamber, and a piston rod connected to the piston, one of the cylinder and the piston rod being operatively connected to the idler wheel and adapted to move the idler wheel in a direction to increase tension in the belt when the actuating chamber is pressurized; a pump; conduit means connecting the pump to the actuating chamber; means for establishing a fluid pressure in the conduit means and the actuating chamber at a level sufficient to generate a predetermined belt tension in the belt when the pump is operating; and means for frictionally locking the piston rod relative to the cylinder and maintaining the predetermined belt tension in the belt when the pump stops operating and the fluid pressure established by the fluid pressure establishing means begins to drop.

The present invention relates to a belt tension control system in which a predetermined tension in an endless drive belt is normally maintained by establishing a fluid pressure in an actuating chamber of a hydraulic actuator connected to a movable idler wheel. The fluid for establishing the fluid pressure is obtained from a pump driven by the vehicle engine and is available only when the pump is in operation. When the pump stops operation and the fluid pressure starts to drop, a locking means frictionally locks the piston of the actuator to maintain the tension in the belt at a predetermined level. Thus the frictional couple between the belt and drive wheel is continuously maintained during extended periods of non-use so that the parking brake is effective for preventing uncontrolled movement of the vehicle.

BRIEF DESCRIPTION OF THE DRAWINGS

FIG. 1 is a partial side elevational view of an exemplary belted vehicle employing an embodiment of the present invention;

FIG. 2 is a partial sectional view taken along line II—II of FIG. 1;

FIG. 3 is a schematic illustration of the control system of the present invention.

BEST MODE FOR CARRYING OUT THE INVENTION

Figure 4:
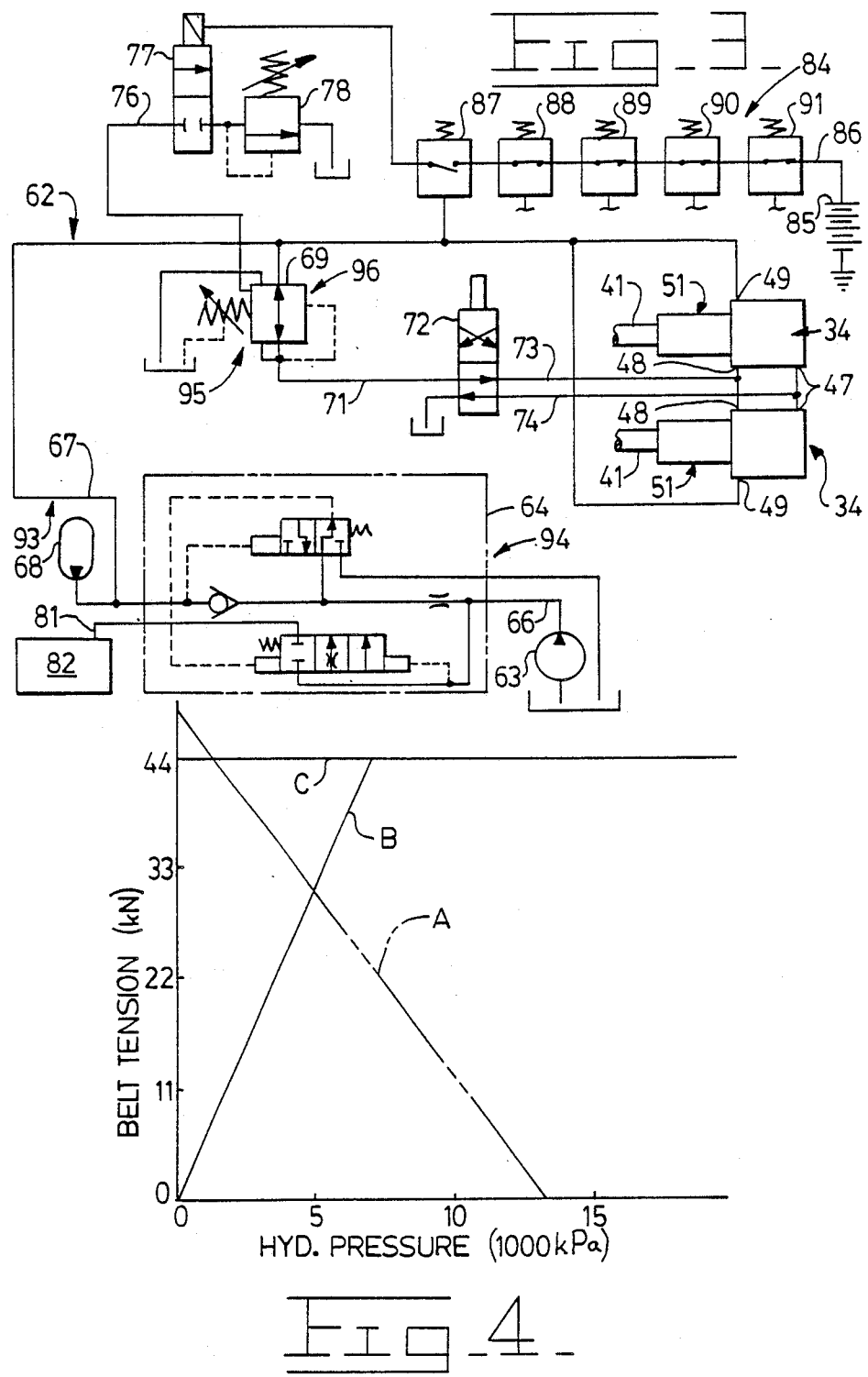
FIG. 4 is a graph illustrating certain operating characteristics of the present invention.

Referring now to FIGS. 1 and 2, a belted work vehicle is partially shown at 10 and has a longitudinally extending main frame 11 and an undercarriage 12 arranged in supporting relation to the main frame 11. The undercarriage 12 includes a pair of laterally separated running gears 13,14. The running gears 13,14 are essentially identically constructed and only running gear 13 will be described in detail. The running gear 13 includes a drive wheel 16 disposed near the rear of the main frame 11, an idler wheel 17 disposed near the forward end of the main frame, an endless inextensible elastomeric belt 18 entrained about and in engagement with the drive and idler wheels 16,17, and a roller system 19 suspended from the main frame longitudinally between the drive wheel and idler wheel. The roller system 19 includes a plurality of rollers 21 which are engagable with the inner surface of the belt 18. The main frame 11 has a pair of laterally separated downwardly extending support ears 22 at the forward end thereof. The drive wheel 16 is operatively connected to a drive train and a parking brake (not shown).

The idler wheel 17 is mounted on the near end (from the vantage point of FIG. 1) of an axle 26 which extends laterally under the main frame 11. A similar idler wheel, not shown, of the running gear 14 is mounted on the far end of the axle 26. The axle 26 has a centrally disposed longitudinally extending bore 28 therein. A suitable universal bearing 29 is positioned within the bore 28 and is slidable disposed on a pivot pin 30 fixedly mounted to longitudinally separated portions of the main frame. The axle 26 has a pair of laterally separated forwardly extending lugs 31, which are longitudinally aligned with the support ears 22 of the main frame 11.

A pair of linear hydraulic actuators 34 are arranged on opposite lateral sides of the pin 30. Each of the actuators includes a cylinder 36 a piston 37 slidably disposed in the cylinder 36 and defining a pair of actuating chambers 38,39, a piston rod 41 connected to the piston 37 and slidable extending through a bore 42 in the cylinder 36. Each of the cylinders 36 is connected to one of the support ears 22 by a pivot pin 43. Each of the piston rods 41 is pivotally connected to one of the lugs 31 of the axle 26 by a pivot pin 44. Each of the cylinders has a pair of ports 46 and 47 individually connected to the actuating chambers 38,39, an outwardly facing counterbore 48 concentric with the bore 42, and another port 49 connected with the counterbore 48.

Each of the hydraulic actuators 34 has a spring applied, hydraulically released friction locking device 51 connected thereto. The friction locking device 51 includes an end cap 52, a cylindrical tube 53, a plurality of tubular spacers 54, a pair of end sleeves 55, a plurality of elongate rods 56 and a plurality of nuts 57. The end cap 52 has a bore 58 extending therethrough, a counterbore 59 facing the cylinder 36 and a plurality of holes 61 extending therethrough. The piston rod 41 slidably extends through the bore 58. The tube 53 has it opposite ends sealingly seated in the counterbores 48 and 59. The elongate rods 56 extend through the holes 61 in the end cap with one end of the rods being suitably connected to the cylinder 36. The nuts 57 are threaded onto the protruding ends of the rods 56 and clamp the tube 53 between the end cap 52 and the of the spacers 54 and the outer diameter of the piston rod 41 are respectively carefully predetermined to insure that interference fits exist between the inner surface of the tube 53 and the outer surface of the spacers 54, and between the inner surface of the spacers 54 and the outer surface of the piston rod 41. Under these circumstances the tube 53 functions as a spring and a particularly secure frictional mechanical lock between the tube 53 and the piston rod 41 will be effected through the spacers 54 to forcibly lock the piston rod relative to the tube 53 and thus the cylinder 36 of the hydraulic actuator 34. This is considered to be an engaged condition of the locking device. The locking device is movable to a disengaged condition wherein the tube 53 is expanded radially within its elastic limit to relieve the interference fits by hydraulic pressure introduced through the port 49.

Referring now to FIG. 3, a belt tension control system 62 is provided for maintaining tension in the endless belts 18 of the undercarriage 12. The control system 62 includes a pump 63 connected to an accumulator charging valve 64 through a supply conduit 66. A delivery conduit 67 is connected to the charging valve 64 and to an accumulator 68, a combined pressure relieving and pressure reducing valve 69, and to the ports 49 of the friction locking devices 51. Another conduit 71 connects the pressure reducing valve to a directional control valve 72 which in turn is connected to the ports 46,47 of the hydraulic actuators 34 through actuator conduits 73 and 74. A vent line 76 is connected to the pressure reducing valve 69 and to a solenoid actuated valve 77 which in turn is connected to a relief valve 78. Another delivery conduit 81 connects the charging valve 69 to an implement circuit 82. The pressure reducing valve 69 is of conventional design and has a small drain orifice (not shown) integrally designed therein.

An electrical circuit 84 is connected to the solenoid valve 77 and includes a battery 85, a line 86 connecting the battery to the solenoid valve and five electrical switches 87,88,89,90,91 disposed in series in the line 86. The switch 87 is normally open and is connected to the conduit 67. The remaining switches 88-91 are normally closed and are operatively connected to fluid sources which are pressurized during various operating conditions of the vehicle. In this embodiment the switch 88 is connected to the reverse gear mechanism such that the switch is opened during reverse drive operation. The switches 89 and 90 are connected to the steering mechanism such that switch 89 is opened during rapid turning in the leftward direction and switch 90 is opened during rapid turning in the rightward direction. The switch 91 is connected to the service brake and is opened when the service brakes are applied.

In this embodiment the supply conduit 66, the delivery conduit 67 and the conduits 71 and 73 constitute conduit means 93 connecting the pump 63 to the actuating chambers 38 of the hydraulic actuators 34. The charging valve 64 constitutes a first valve means 94 for establishing a first pressure level in the friction locking devices 51 and the pressure reducing valve 69 constitutes a second valve means 95 for establishing a second pressure level in the actuating chambers 38 wherein the second pressure level is lower than the first pressure level. The first and second valve means 94 and 95 constitute means 96 for establishing a fluid pressure in the conduit means 93 and actuating chamber 38 at a level sufficient to generate a predetermined belt tension in the belt when the pump 63 is operating. The friction locking devices 51 constitute a means 97 for frictionally locking the piston rod 41 relative to the cylinder 36 and maintaining the predetermined belt tension in the belts 18 when the pump 63 stops operating and the fluid pressure established by the fluid pressure establishing means 96 drops below a predetermined level.

Referring now to FIG. 4, the broken line A represents the load holding capability of the locking devices 51 relative to the pressure level of the fluid pressure in the conduit 67. The solid line B represents the tension exerting force of the hydraulic actuators 34 relative to the pressure in the line 71. The solid horizontal line C is representative of the tension in the belts 18 at the time the vehicle is normally shut off and the pump 63 stops operating.

INDUSTRIAL APPLICABILITY

In use, when the pump 63 is operating, pressurized fluid is directed through the supply conduit 66 to the charging valve 64. The charging valve 64 functions to transmit the amount of fluid necessary to maintain the pressure level in the conduit 67 and thus the accumulator 68 and the friction locking devices 51 between about 13,500 and 15,000 kPa. Excess fluid from the pump 63 is delivered to the implement circuit 82 through the conduit 81. The pressurized fluid in the friction locking device 51 expands the tube 53 radially within its elastic limit sufficiently to relieve the interference fit so that the piston rod 41 can freely slide through the spacers 54.

The pressurized fluid in the conduit 67 is also delivered to the pressure reducing valve 69. With the solenoid valve 77 in the position shown, the pressure reducing valve 69 is at a high pressure setting and reduces the pressure of the fluid passing therethrough into the conduit 71 to about 12,400 kPa. With the solenoid valve 77 shifted downwardly to an open position, the pressure reducing valve 69 is at a low pressure setting and reduces the pressure of the fluid in conduit 71 to about 7,300 kPa. With the directional control valve 72 in the position shown, the pressurized fluid in conduit 71 passes therethrough and into the actuating chambers 38 where it exerts a force tending to retract the piston rods 41. Retracting the piston rods 41 pulls the axle 26 and thus the idler wheels 17 forwardly relative to the drive wheel 16 to generate a predetermined tension in the drive belts 18. In this embodiment when the pressure level in the conduit 71 is at the low pressure level of 7,300 kPa the tension in the belt is approximately 44 kN. When the fluid pressure in the conduit 71 is at the higher pressure of 12,400 kPa the tension in the belts is approximately 76 kN.

The pressure switch 87 in this embodiment opens when the fluid pressure in the delivery conduit 67 is at some level below 7,300 kPa, for example, 5,000 kPa. Thus when the fluid pressure in the conduit 67 is at the normal operating range of between 13,500 kPa to 15,000 kPa the switch 87 is closed to complete the electrical circuit from the battery 85 to the solenoid valve 77 causing the solenoid valve to move to the open position. At the open position, the vent line 76 is communicated to the tank through the relief valve 78 to establish the low pressure setting of the pressure reducing valve 69. Thus under normal operating conditions, the control system 62 maintains the tension in the belts 18 at about 44 kN.

However, under certain operating conditions it is desirable to increase the tension in the belts 18 to the higher level of 76 kN. One example of when the increased tension is desirable is during braking operation of the vehicle. When the vehicle is braked, pressurized fluid from the brake system opens the switch 91 to deenergize the solenoid valve 77. Deenergizing the solenoid valve 77 causes it to move to the blocking position to block communication through the vent line 76. As previously noted, when the solenoid valve 77 is in the blocking position, the pressure reducing valve 69 establishes the higher pressure level in the conduit 71 and thus the higher tension in the belts. Releasing the service brake closes the switch 91 to reenergize the solenoid valves 77 and thereby reestablish the low pressure setting in the conduit 71. Other operating conditions where high belt tension is desirable is when the vehicle is being steered in either direction or when the vehicle is being operated in reverse.

In this embodiment of the control system 62 the friction locking devices 51 automatically lock the piston rods 41 relative to the cylinders 36 so that tension in the belts 18 is maintained at the 44 kN level when the pump 63 stops operating such as when the vehicle engine is shut off. More specifically, when the pump 63 stops supplying pressurized fluid to conduit 67 through the charging valve 64, the pressurized fluid trapped in the conduit 67, the accumulator 68, and the friction locking devices 51 is gradually vented to the tank through the internal orifice in the pressure reducing valve 69. All of the switches 87-91 are normally closed at the time the engine is shut down so that the pressure reducing valve 69 is at the low pressure setting of 7,300 kPa and the tension in the belt is at the 44 kN level. Referring to the graph of FIG. 4, it will be seen that the friction locking devices 51 start to frictionally engage the piston rods 41 when the pressure drops below about 13,000 kPa. The holding capability of the friction locking devices increases in proportion to the decrease in pressure in the conduit 67 so that by the time the fluid pressure drops to about 7,300 kPa it will be capable of holding about 31 kN of tension in the belts 18. When the pressure in the conduit 67 drops below 7,300 kPa the fluid pressure in the conduit 71 and thus the actuating chambers 38 also starts to drop simultaneously with the fluid pressure drop in the conduit 67 so that the tension engaging force exerted by the hydraulic actuators 34 also starts to decrease. However, since such force gradually decreases as the load holding capability of the locking devices 51 increases, the locking devices are effective to hold the piston rods 41 relative to the cylinders 36 and maintain the tension in the belts 18 at the 44 kN level.

When the pressure in the conduit 67 drops below about 5,000 kPa, the pressure switch 87 opens to break the electrical circuit from the battery 85 to the solenoid valve 77 to prevent drain of electrical current from the battery. Although this allows the the solenoid valve to move to the blocking position, such action has no effect on the automatic locking sequence of the friction locking devices 51.

When the pump 63 begins operation during engine startup, the reverse of the above takes place wherein the tension exerting force of the hydraulic actuators 34 gradually increases while the load holding capability of the friction locking devices 51 gradually decreases. This results in maintaining the tension in the belts 18 at the 44 kN level during the startup sequence.

During normal vehicular operation, the hydraulic actuators 34 and the pressure relieving function of the pressure reducing valve 69 serves as a recoil mechanism should foreign matter become trapped between the belt 18 and the idler wheel 17 or drive wheel 16. When this happens, the idler wheel 17 is forced rearwardly pulling the associated piston rod 41 rearwardly. The hydraulic fluid displaced from the actuating chamber passes through the pressure reducing valve directly to the tank.

The directional control valve 72 can be shifted downward from the position shown in the drawing to direct pressurized fluid through the conduit 74 and into the actuating chambers 39. This extends the piston rods 41 to move the axle 26 and idler wheels 17 rearwardly to relieve the tension in the belts 18. This action is employed when one or both of the belts are to be removed from the vehicle.

In view of the above, it is readily apparent that the structure of the present invention provides an improved belt tension control system for continuously maintaining tension in the drive belts of a friction driven belt laying vehicle even when the engine of the vehicle is shut down and the pump supplying pressurized fluid to the control system is not operating. By maintaining tension in the drive belts, the frictional couple between the belts and the drive wheels is maintained so that the parking brake remains effective for holding the vehicle at a desired location for an indefinite period of time.

Other aspects, objects and advantages of this invention can be obtained from a study of the drawings, the disclosure and the appended claims.

I claim:

1. A belt tension control system for maintaining tension in an endless drive belt entrained about a drive wheel and an idler wheel, said idler wheel being movable relative to the drive wheel for adjusting the tension in the belt, comprising:

a hydraulic actuator including a cylinder, a piston slidably disposed in the cylinder and defining an actuating chamber, and a piston rod connected to the piston, one of the cylinder and the piston rod being operatively connected to one of the wheels and movable in a first direction to increase tension in the belt when the actuating chamber is pressurized;

a pump;

conduit means connecting the pump to the actuating chamber;

means for establishing a fluid pressure in the conduit means and the actuating chamber at a level sufficient to generate a predetermined belt tension in the belt when the pump is operating;

recoil means for permitting the displacement of pressurized fluid from the actuating chamber so that said one of the cylinder and the piston rod can move in a second opposite direction when foreign matter becomes trapped between the drive belt and one of the wheels; and means for frictionally locking the piston rod relative to the cylinder and maintaining the predetermined belt tension in the belt when the pump stops operating and the fluid pressure established by the fluid pressure establishing means drops below a predetermined level.

2. The control system of claim 1 wherein said frictional locking means includes a spring applied hydraulically released friction locking device connected to the cylinder of the hydraulic actuator and operatively associated with the piston rod, said locking device being movable between an engaged condition at which the piston rod is retained at a fixed position relative to the cylinder and a disengaged condition at which the piston rod is freely movable relative to the cylinder.

3. The control system of claim 2 wherein said conduit means is connected to the friction locking device and said fluid pressure establishing means establishes a fluid pressure in the friction locking device at a level sufficient to move the locking device to the disengaged condition.

4. The control system of claim 3 wherein said fluid pressure establishing means includes a first valve means for establishing a first pressure level in the friction locking device and a second valve means for establishing a second pressure level in the actuating chamber of the hydraulic actuator wherein the second pressure level is lower than the first pressure level.

5. The control system of claim 4 wherein said conduit means includes a supply conduit connecting the pump to the first valve means, a delivery conduit connecting the first valve means to the second valve means and the friction locking device, and a third conduit communicating the second valve means to the actuating chamber of the hydraulic actuator.

6. The control system of claim 5 wherein said first valve means is a charging valve and the second valve means is a pressure reducing valve.

* * * * *